United States Patent [19]
Van Eeden

[11] Patent Number: 6,154,136
[45] Date of Patent: Nov. 28, 2000

[54] FREE RUNNING RF IDENTIFICATION SYSTEM WITH INCREASING AVERAGE INTER TRANSMISSION INTERVALS

[76] Inventor: Hendrik Lodewyk Van Eeden, 607 Sean Street, Moreleta Park, 0044 Gauteng Province, South Africa

[21] Appl. No.: 09/257,385

[22] Filed: Feb. 25, 1999

[30] Foreign Application Priority Data

Feb. 26, 1998 [ZA] South Africa .......................... 98/1592

[51] Int. Cl.[7] .................................................. G08B 13/14
[52] U.S. Cl. .................. 340/572.1; 340/10.2; 340/10.32
[58] Field of Search .............................. 340/572.1, 10.1, 340/10.2, 10.32

[56] References Cited

U.S. PATENT DOCUMENTS

| | | | |
|---|---|---|---|
| 4,614,945 | 9/1986 | Brunius et al. | 340/870.03 |
| 4,799,059 | 1/1989 | Grindahl et al. | 340/870.03 |
| 4,818,998 | 4/1989 | Apsell et al. | 342/44 |
| 5,189,246 | 2/1993 | Marsh et al. | 102/217 |
| 5,264,854 | 11/1993 | Spiess | 342/44 |
| 5,282,421 | 2/1994 | Marsh et al. | 102/217 |
| 5,353,009 | 10/1994 | Marsh et al. | 340/505 |
| 5,406,890 | 4/1995 | Marsh et al. | 102/217 |
| 5,519,381 | 5/1996 | Marsh et al. | 340/10.2 |
| 5,537,105 | 7/1996 | Marsh et al. | 340/10.32 |
| 5,557,280 | 9/1996 | Marsh et al. | 342/44 |
| 5,566,441 | 10/1996 | Marsh et al. | 29/600 |
| 5,699,066 | 12/1997 | Marsh et al. | 342/44 |
| 5,726,630 | 3/1998 | Marsh et al. | 340/10.2 |
| 5,751,570 | 5/1998 | Stobbe et al. | 340/825.49 X |

FOREIGN PATENT DOCUMENTS

96/9411  11/1996  South Africa .

Primary Examiner—Thomas Mullen
Attorney, Agent, or Firm—Finnegan, Henderson, Farabow, Garrett, & Dunner, L.L.P.

[57] ABSTRACT

An RF electronic identification system 10 is disclosed and claimed. The system includes a reader 12 and a plurality of transponders 14.1 to 14.n. When energized by an interrogation signal from the reader, each transponder automatically responds by repeatedly retransmitting a signal burst including identification code data associated with the relevant transponder. Each transponder includes circuitry 34 for generating random inter-transmission intervals for separating any two consecutive signal bursts and a controller 42 for the generation circuitry, to cause an average value of the inter-transmission intervals over a period of time to vary, preferably to increase. This feature enhances the probability and speed of reading a transponder population of almost any size.

19 Claims, 4 Drawing Sheets

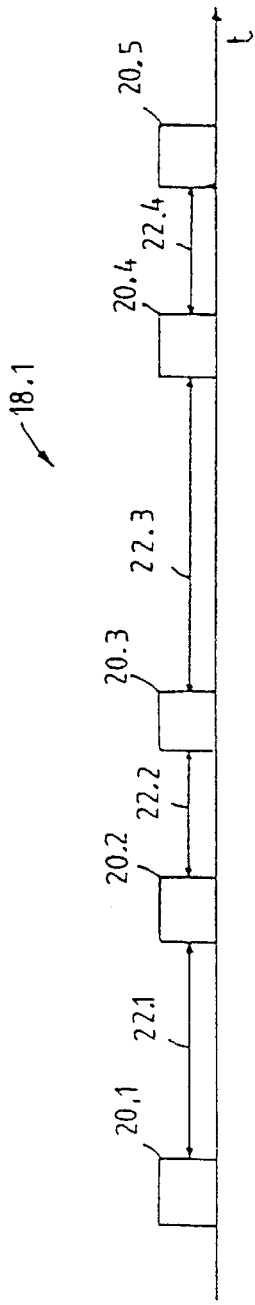
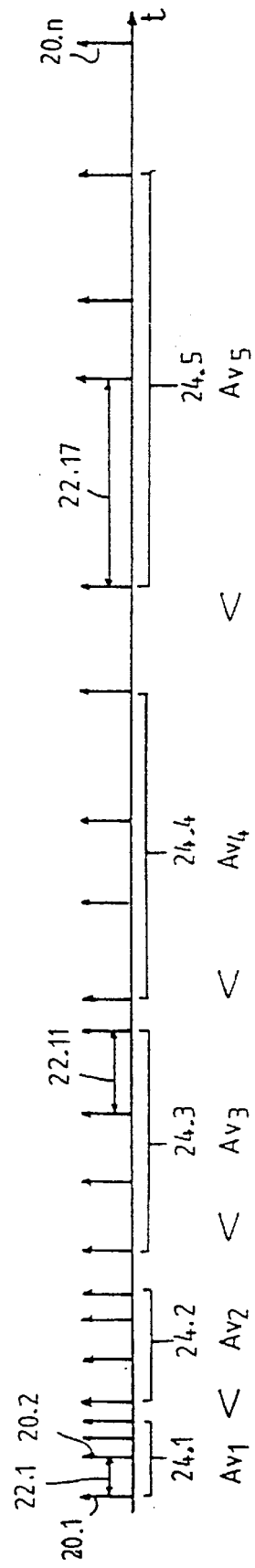
FIGURE 3
FIGURE 4

FREE RUNNING RF IDENTIFICATION SYSTEM WITH INCREASING AVERAGE INTER TRANSMISSION INTERVALS

INTRODUCTION AND BACKGROUND

THIS invention relates to data communication systems, more particularly to interrogation systems such as electronic identification systems.

Radio frequency (RF) electronic identification systems including an interrogator or reader and a plurality of passive transponders are well known in the art. In use, the reader energizes the transponders by transmitting an interrogation signal. Each energized transponder automatically responds with a response signal, normally including an identification code characteristic of the transponder. The response signals are received by the reader and the data is read. The data may be utilized to identify transponders and goods associated with the transponders and/or to count the transponders and/or goods. However, when a plurality of transponders are energized simultaneously, it may well happen that the response signals overlap in time, that the transmissions clash and that the data in the response signals is lost.

Accordingly, systems of the aforementioned kind provide for anti-clash or anti-collision measures or protocols. One way of reducing the effect of collisions is to make use of two-way communications. In a typical system employing two way communications, once the data of a transponder has been read, the reader transmits an acknowledgement signal. This acknowledgement signal causes the transponder just read to enter a sleep mode wherein it no longer responds to the interrogation signal, even while still being energized. This switching of a transponder just read to a sleep mode, reduces the transponder population not yet read and hence reduces the probabilities of collisions. The major disadvantage of this protocol is that it requires a larger communications channel bandwidth. Accordingly, it is not suitable for many narrow band applications.

In so-called free-running systems (these are systems where no acknowledgement signal is transmitted) it has been proposed, for example in SA Patent 95/9519, to configure the transponders such as to retransmit the reply signals at random inter-transmission intervals. This gives a statistical probability that transponders would sometimes transmit at a time when no other transponder is transmitting, thereby enabling the reader eventually to receive a reply signal successfully from each transponder. However, if a large number of transponders are present, the probability of a successful transmission is reduced and the time required to receive the transmissions from all the transmitters becomes larger, i.e. the communication channel becomes congested. If the number of transponders is increased too much, the probability of a successful transmission may become so low, that the time required to receive a transmission from each of the transponders becomes unpractically long (even infinitely long). The communications channel can then be said to be saturated. With these systems and if the maximum inter-transmission interval is made shorter, the communications channel may saturate with a relatively small number of transponders, but on the other hand the time required successfully to read a small number of transponders would be short. Furthermore, if the maximum inter-transmission interval is made longer to accommodate a larger transponder population, the total time to read the transponders (even a small number of transponders), may be too long for many applications. In practice this means that a specific transponder can only be used in an application where its maximum inter-transmission interval is compatible with the number of transponders that would be present and the time required successfully to read the transponders.

OBJECT OF THE INVENTION

Accordingly it is an object of the invention to provide a communication system, a transmitter or transponder and a method of transmitting signals with which the applicant believes the aforementioned disadvantages may at least be alleviated.

SUMMARY OF THE INVENTION

According to the invention there is provided a communication system including:
 a plurality of transmitters each configured repeatedly to retransmit a signal burst;
 a reader for receiving and reading the signal bursts transmitted by the transmitters sequentially;
 each transmitter including:
  inter-transmission interval generating means for generating random inter-transmission intervals for separating any two consecutive signal bursts; and
  control means for the interval generating means automatically to cause an average value of the inter-transmission intervals over a period of time, to vary.

Each transmitter may form part of a passive transponder and the system may further include energizing means for energizing the transponders. The reader and energizing means may be separated or may be combined in a single unit.

Preferably the transmitters are radio frequency transmitters.

Each transmitter may for example include a back-scatter modulator stage for back-scatter modulating the energizing signal with the signal burst.

Each signal burst may include data relating to a unique identification code of the transponder of which the transmitter forms part.

The inter-transmission interval may vary randomly or pseudo-randomly between a minimum value and a maximum value.

The average value may be varied by progressively increasing the maximum value for the inter-transmission interval. The maximum value of the inter-transmission interval may be increased in step-wise manner. In a preferred embodiment, the maximum value of the inter-transmission interval is substantially doubled after each four transmissions of the signal burst.

Also included within the scope of the present invention is a transmitter for repeatedly transmitting a signal burst, the transmitter including:
 inter-transmission interval generation means for generating random inter-transmission intervals for separating any two consecutive signal bursts; and
 control means for the interval generating means to cause an average value of the inter-transmission intervals over a period of time, to very.

Yet further included within the scope of the present invention is a passive transponder including a transmitter as herein defined and/or described.

The inter-transmission interval generation means may include: a comparator; an n-bit random number generator an output of which is connected to a first input of the comparator; an m-bit first counter an output of which is connected to a second input of the comparator, the first counter being driven by a clock signal and the output of the comparator being connected to enable transmission of a signal burst when the contents of the first counter is equal to the random number generated.

The control means for the interval generating means may include: a second counter for controlling the number of bits of the random number and in the first counter to be compared; and a third counter, an input of the third counter being connected to the output of the comparator, to be incremented with each transmission; an output of the third counter being connected to an input of the second counter, to increment the second counter after a predetermined number of transmissions, thereby to increase the count of the second counter and hence the number of bits to be compared.

Also included within the scope of the present invention is a method of retransmitting a signal burst including the steps of:

generating a sequence of inter-transmission intervals of random length;

repeatedly transmitting the signal burst after successive ones of the sequence of intervals; and causing an average value of the inter-transmission intervals over a period of time, to vary.

BRIEF DESCRIPTION OF THE ACCOMPANYING DIAGRAMS

The invention will now further be described, by way of example only, with reference to the accompanying diagrams wherein:

FIG. 3 is a time diagram illustrating random inter-transmission intervals;

FIG. 4 is a further time diagram, but over a longer period of time, illustrating an increase in the average value of the inter-transmission interval.

DESCRIPTION OF A PREFERRED EMBODIMENT OF THE INVENTION

Figure 1:
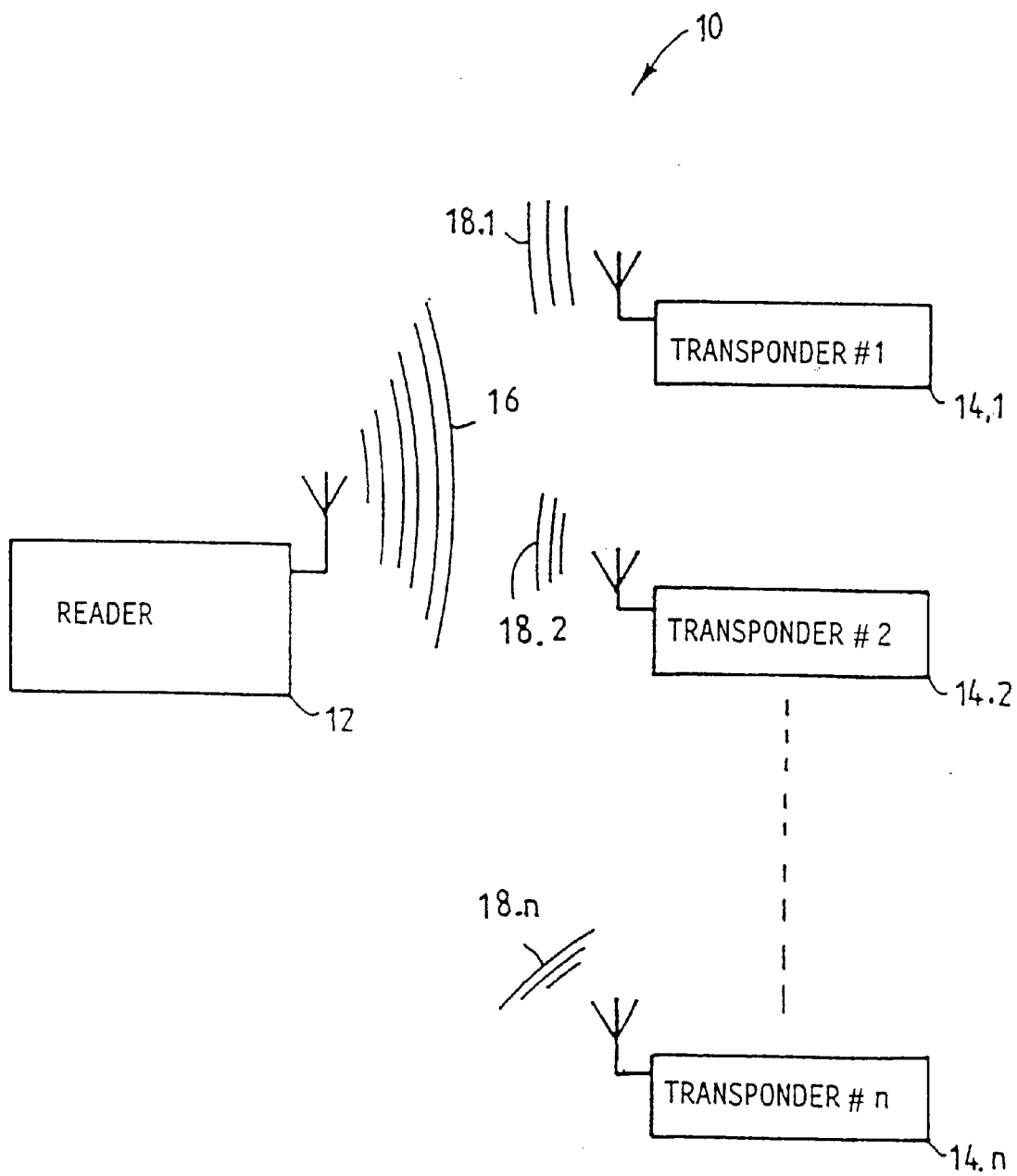
FIG. 1 is a block diagram of a radio frequency (RF) electronic identification system according to the invention.

In FIG. 1, a radio frequency (RF) electronic identification system 10 is shown. The system includes an interrogator or reader 12 and a plurality of transmitters, in the form of passive transponders 14.1 to 14.n.

In use, the reader 12 transmits an energizing signal 16 towards the transponders 14.1 to 14.n. Each of the transponders is energized in known manner and automatically responds with response signals 18.1 to 18.n, for example by backscatter modulating the energizing signal 16. The response signals 18.1 to 18.n normally include data relating to a unique Identification (ID) code associated with the relevant transponder.

The response signals 18.1 to 18.n are received by a receiver (not shown) of the reader and the data is read by the reader, to identify the transponders and hence articles (not shown) that may be associated with the transponders and/or to count the number of transponders and hence articles.

As shown in FIG. 3, each signal 18.1 to 18.n includes a plurality of repeated similar signal bursts 20.1 to 20.5 separated by inter-transmission intervals 22.1 to 22.4. Each burst includes the ID code data referred to hereinbefore. In SA Patent 95/9519 it is proposed to generate random inter-transmission intervals, to alleviate the problems of signal burst collisions between signals transmitted by different transponders. As stated in the introduction of this specification, this proposal still has severe problems and/or shortcomings.

It is a characteristic of the present invention that the average value $A_{v1}$, $A_{v2}$, $A_{v3}$, $A_{v4}$, and $A_{v5}$ of the random inter-transmission intervals 22.1 to 22.n over a sequence of successive periods of time 24.1 to 24.5 is automatically varied, preferably increased. This is illustrated in FIG. 4, where $A_{v1}<A_{v2}<A_{v3}<A_{v4}<A_{v5}$.

Figure 2:
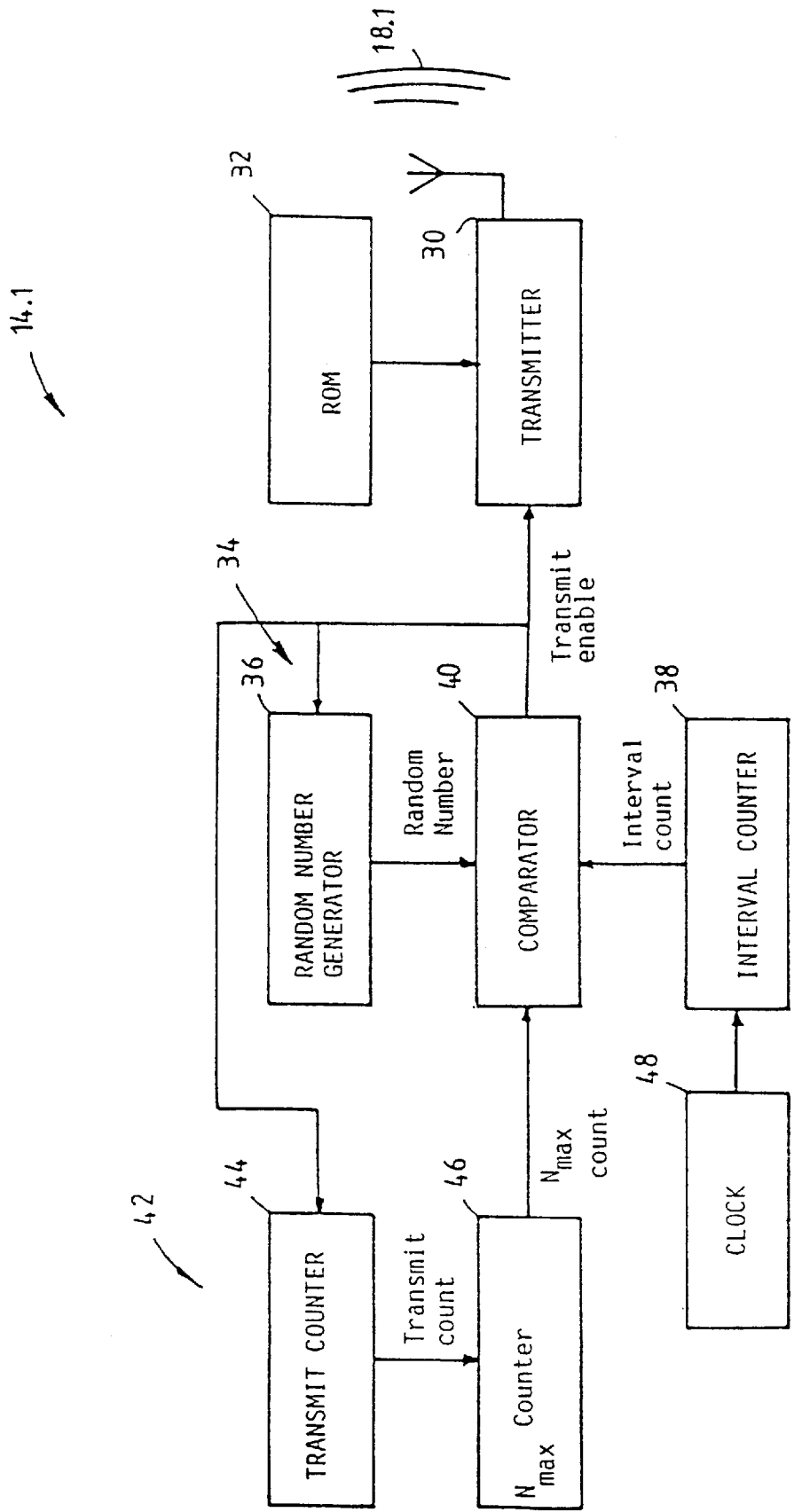
FIG. 2 is a block diagram of relevant parts of a transponder forming part of the system.

In FIG. 2, there is shown a block diagram of relevant parts only, of a transponder 14.1 according to the invention. The transponder 14.1 includes a transmitter stage 30 for transmitting the response signal 18.1 with the signal bursts separated by random inter-transmission intervals. The ID code data is stored in read only memory (ROM) 32.

The transponder further includes random inter-transmission interval generation means 34 including a random number generator 36, an interval counter 38 and a comparator 40. Control means 42 for the generation means 34 includes a transmit counter 44 and a counter 46 controlling a maximum value $N_{max}$ for the inter-transmission interval. The various components are interconnected as shown in FIG. 2.

The random inter-transmission interval generation means 34 operates as follows. When the transponder is energized by signal 16, a seed value is loaded into the random number generator 36 and a random number is generated. After each transmission burst, 8 new random number is generated. The interval counter 38 Is initially reset to zero. It is incremented with each pulse of clock 48. The comparator 40 compares the random number generated and the count of interval counter 38. When they match, a signal burst including the ID code data is enabled.

The random intervals are varied between a minimum value and a maximum value $N_{max}$ for the inter-transmission interval. The average value of the inter-transmission interval is controlled by controller 42, by causing the maximum value $N_{max}$ to be increased periodically, typically after each four transmission bursts, as shown in FIG. 4. Computer simulations have indicated that doubling the value of $N_{max}$ after every four transmission bursts gives nearly optimal reading times for transponder populations including any number of passive RF ID transponders.

The maximum value is controlled by controlling the number of bits in the random number and the interval counter 38 that are compared. The number of bits that are compared are controlled by counter 46. $N_{max}$ is given by $2^N-1$, where N is the number of bits that must be compared which is equal to the count in counter 46. For example, if the count in counter 46 is four, the value of $N_{max}$ is $2^4-1=15$. The value of $N_{max}$ is increased by increasing the number of bits that are compared. This is achieved by periodically incrementing counter 46. The transmit-counter 44 is initially reset to zero and thereafter incremented after each signal burst. When it reaches a predetermined value (typically four), the counter 46 is incremented and the transmit-counter is reset to zero. Incrementing the counter 46 by one, increases the compare bit width by one bit, effectively doubling the value of $N_{max}$. For example, if counter 46 is incremented from four to five, the value $N_{max}$ changes from fifteen (15) to thirty-one (31).

This process continues until the interrogation signal disappears, or until the maximum value for $N_{max}$ is reached. The maximum value of $N_{max}$ is determined by the number of bits in the comparator 40, the random number generator 36 and the interval counter 38. If these are all sixteen (16) bits wide, the maximum value of $N_{max}$ is 65535. Of course in some applications $N_{max}$ can be restricted to a number smaller than that dictated by the counter bit widths.

Figure 5:
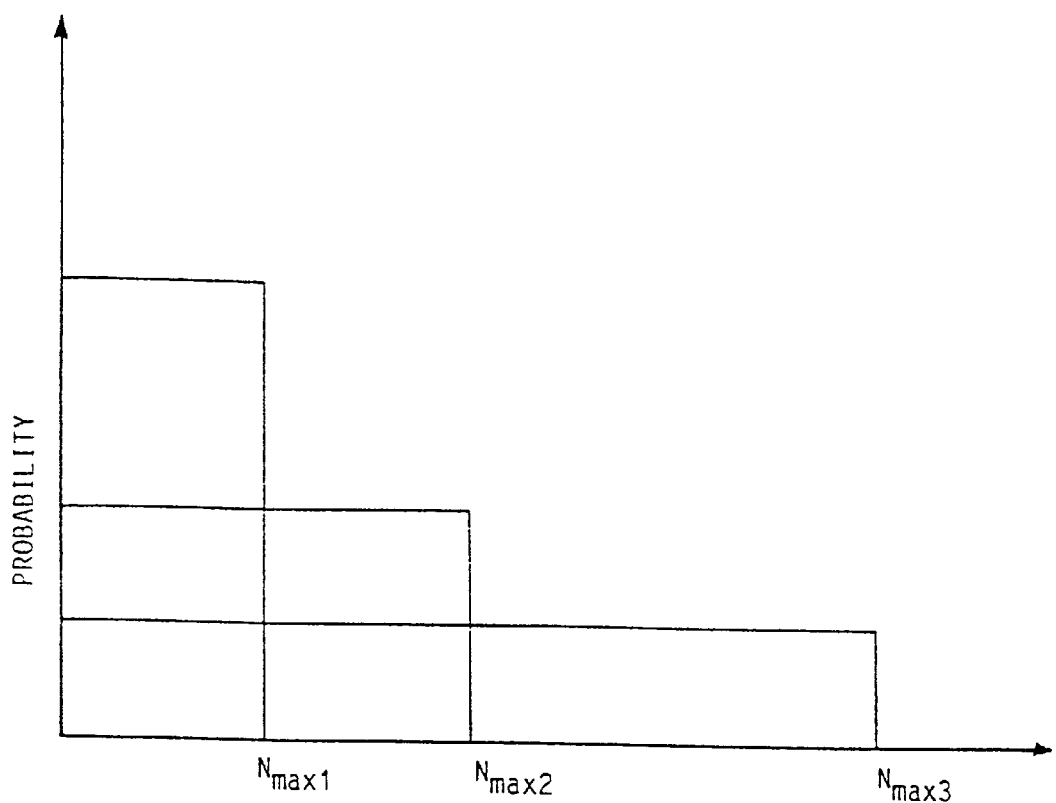
FIG. 5 is a diagram illustrating the statistical distribution of inter-transmission intervals as the average value of the inter-transmission intervals are increased in use and according to the invention.

In FIG. 5, the statistical distribution of inter-transmission intervals shown as $N_{max}$ is doubled in step-wise manner as herein described.

The invention thus ensures that a transponder population including only a small number of transponders will be read quickly. With a transponder population including a large number of transponders, the channel will initially be congested, but as the value of $N_{max}$ is increased, the congestion will be gradually decreased, until all the transponders have been read successfully.

Although a system including passive transponders 14.1 to 14.n is described herein, the system and method according to the invention may also be employed utilizing self powered transmitters or any other group of transmitters which transmit simultaneously. The communication channel between the reader and transmitters may be an RF channel through free space or air as described herein, but it could also be wave guides or cables and the signal may be any electromagnetic signal or even an acoustic signal.

It will be appreciated by those skilled in the art that the invention may be put into effect in a number of different ways. When the invention is implemented as a sub-circuit in a custom chip or in a discrete printed circuit board, a master controller (not shown) will be responsible for incrementing and resetting the various counters. It is also possible to implement the invention as an algorithm in the firmware of a micro-controller (also not shown).

It will further be appreciated that there are many variations in detail on the system, transmitter and method according to the invention without departing from the scope and spirit of the appended claims.

What is claimed is:

1. A communication system including:
   a plurality of transmitters each configured repeatedly to transmit a signal burst;
   a reader for receiving and reading the signal bursts transmitted by the transmitters sequentially;
   each transmitter including:
      inter-transmission interval generation means for generating random inter-transmission intervals for separating any two consecutive signal bursts; and
      control means for the interval generating means to cause an average value of the inter-transmission intervals over a period of time, to vary.

2. A system as claimed in claim 1 wherein each transmitter forms part of a passive transponder and wherein the system further includes energizing means for energizing the transponders.

3. A system as claimed in claim 2 wherein each signal burst includes data relating to a unique identification code of the transponder of which the transmitter forms part.

4. A system as claimed in claim 1 wherein the transmitters are radio frequency transmitters.

5. A system as claimed in claim 1 wherein the inter-transmission interval varies randomly between a minimum value and a maximum value.

6. A system as claimed in claim 5 wherein the average value is varied by progressively increasing the maximum value for the inter-transmission interval.

7. A system as claimed in claim 6 wherein the maximum value of the inter-transmission interval is increased in step-wise manner.

8. A system as claimed in claim 7 wherein the maximum value of the inter-transmission interval is substantially doubled after each four transmissions of the signal burst.

9. A system as claimed in claim 1 wherein the inter-transmission interval varies pseudo-randomly between a minimum value and a maximum value.

10. A transmitter for repeatedly transmitting a signal burst, the transmitter including:
    inter-transmission interval generation means for generating random inter-transmission intervals for separating any two consecutive signal bursts; and
    control means for the interval generating means to cause an average value of the inter-transmission intervals over a period of time, to vary.

11. A passive transponder including a transmitter as claimed in claim 10.

12. A passive transponder as claimed in claim 11 wherein each signal burst includes data relating to a unique identification code of the transponder.

13. A passive transponder as claimed in claim 11 wherein the inter-transmission interval varies randomly between a minimum value and a maximum value and wherein the average value is varied by progressively increasing the maximum value for the inter-transmission interval.

14. A passive transponder as claimed in claim 13 wherein the maximum value of the inter-transmission interval is substantially doubled after each four transmissions of the signal burst.

15. A transponder as claimed in claim 11 wherein the inter-transmission interval generation means includes: a comparator; an n-bit random number generator an output of which is connected to a first input of the comparator; an m-bit first counter an output of which is connected to a second input of the comparator, the first counter being driven by a clock signal and the output of the comparator being connected to enable transmission of a burst signal when the contents of the first counter is equal to the random number generated.

16. A transponder as claimed in claim 15 wherein the control means for the interval generating means includes: a second counter for controlling the number of bits of the random number and in the first counter to be compared; and a third counter, an input of the third counter being connected to the output of the comparator, to be incremented with each transmission; an output of the third counter being connected to an input of the second counter, to increment the second counter after a predetermined number of transmissions, thereby to increase the count of the second counter and hence the number of bits to be compared.

17. A method of retransmitting a signal burst including the steps of:
    generating a sequence of inter-transmission intervals of random length varying between a minimum value and a maximum value;
    repeatedly transmitting the signal burst after successive ones of the sequence of intervals; and
    causing an average value of the inter-transmission intervals over a period of time to vary, by intermittently varying the maximum value.

18. A method as claimed in claim 17 wherein the average value is varied by progressively increasing the maximum value for the inter-transmission interval.

19. A system as claimed in claim 18 wherein the maximum value for the inter-transmission interval is substantially doubled after each four transmissions of the signal burst.

* * * * *